United States Patent [19]

Drewek

[11] Patent Number: 4,673,205
[45] Date of Patent: Jun. 16, 1987

[54] VEHICLE BODY STRUCTURE

[75] Inventor: David F. Drewek, Sterling Heights, Mich.

[73] Assignee: General Motors Corporation, Detroit, Mich.

[21] Appl. No.: 874,464

[22] Filed: Jun. 16, 1986

[51] Int. Cl.⁴ .............................................. B60R 19/04
[52] U.S. Cl. ..................................... 293/132; 293/155; 293/133; 296/188; 296/194
[58] Field of Search ............... 293/131, 133, 132, 152, 293/155; 296/188, 194, 195, 187, 198

[56] References Cited

U.S. PATENT DOCUMENTS

| | | | |
|---|---|---|---|
| 1,595,390 | 8/1926 | Fageol | 293/152 |
| 2,837,176 | 6/1958 | Dropkin | 293/1 |
| 3,307,868 | 3/1967 | Blank | 293/132 |
| 3,519,301 | 7/1970 | Somnitz | 293/133 |
| 3,715,137 | 2/1973 | Sandberg | 293/133 |
| 3,747,969 | 7/1973 | Diener | 293/133 |
| 3,779,591 | 12/1973 | Rands | 293/133 |
| 3,789,944 | 2/1974 | Barenyi | 296/194 |
| 3,853,344 | 12/1974 | Shimo | 293/133 |
| 4,005,891 | 2/1977 | Michals | 293/131 |

Primary Examiner—Robert R. Song
Attorney, Agent, or Firm—Herbert Furman

[57] ABSTRACT

A vehicle body structure includes a rear frame rail having its forward end secured to the rearward end of a rocker structure by a hollow torque box structure. A tension member extends between the outboard wall of the rocker structure and the torque box structure to reinforce the weldments between the torque box structure and the rocker structure under impact loads transferred from the frame rail to the rocker structure by the torque box structure.

6 Claims, 3 Drawing Figures

VEHICLE BODY STRUCTURE

This invention relates generally to vehicle body structures and more particularly to the interconnection of the frame rails and rocker structures of vehicle bodies.

In vehicle body structures it is common to mount energy absorbing units on the outer ends of the front and rear frame rails to support the front and rear bumpers of the vehicle and absorb impact loads below a predetermined value. The frame rails are thus subject to the impact loads received by the bumpers. In this invention, the inner or forward end of each rear frame rail is connected to the rearward end of a respective rocker structure through a torque box, which is in the form of a hollow walled enclosure extending between the outboard wall of the frame rail and the rocker inner member or inboard wall of the respective rocker structure. In order to reinforce the torque box and prevent separation of the weldments between the walls of the torque box and the inboard wall of the rocker structure, a tension member interconnects the outboard wall of the rocker structure and the upper and rear walls of the torque box. This tension member, in its preferred embodiment, comprises a bolt which extends through aligned openings in the outboard and inboard walls of the rocker structure and threads into a nut which is caged in a supporting bracket welded to the upper and rear walls of the torque box. Additionally, in order to reinforce the outboard wall of the rocker structure against collapse when the bolt is torqued into the nut, a stiffener interconnects the outboard and upper walls of the rocker structure and the rear wheelhouse outer member which provides the rear wall of the rocker structure. Thus the weldments between the walls of the torque box and the rocker structure are reinforced against separation during transfer of impact loads by the torque box from the rear frame rail to the rocker structure.

The primary feature of this invention is that it provides an improved vehicle body structure wherein a torque box interconnects a frame rail and rocker structure for transferring impact loads therebetween and a tension member further interconnects the rocker structure and the torque box to reinforce the weldment connection between the torque box and the rocker structure.

This and other features will be readily apparent from the following specification and drawings wherein.

Figure 1:
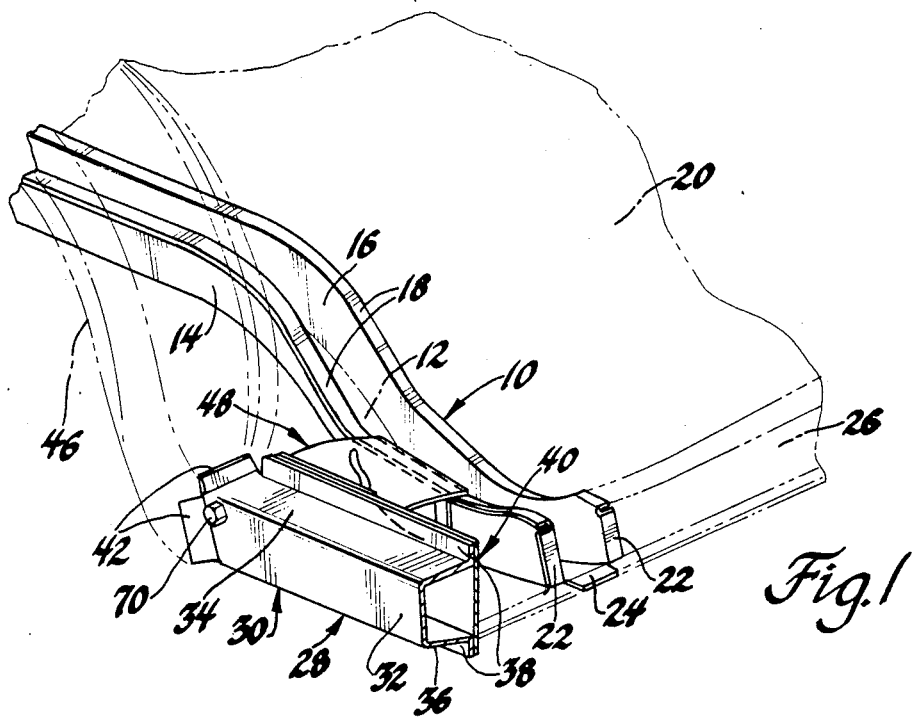
FIG. 1 is a partial perspective view of a vehicle body structure according to this invention.

Referring now to FIG. 1 of the drawings, the rear portion of a sheet metal vehicle body structure includes a generally U-shaped righthand rear frame rail 10 having a lower wall 12, an outboard wall 14 and an inboard wall 16. The walls 14 and 16 include lateral flanges 18 at their upper ends. These flanges are welded to a rear floor pan 20 which is indicated by dash dot lines in FIG. 1. The rearward end of the frame rail 10 supports a conventional energy absorbing strut, not shown, which mounts the righthand side of the rear bumper. A like rail 10 is provided on the lefthand side of the body structure for supporting the lefthand energy absorbing bumper unit which supports the lefthand portion of the rear bumper of the vehicle. The lefthand rail is also welded to the floor pan 20. The forward ends of the walls 14 and 16 each terminate in a lateral flange 22 while the forward end of the wall 12 terminates in a lateral flange 24. The flanges 22 and 24 are welded to the rear portion of the kickup panel 26 as indicated by dash dot lines in FIG. 1.

The righthand rocker structure 28 includes a rocker outer member 30 having an outboard wall 32, an upper wall 34 and a lower wall 36. Walls 34 and 36 terminate in lateral flanges 38 which are welded to the outer surface of the rocker inner member 40. The rearward ends of walls 32 and 34 terminate in a laterally outwardly extending flange 42 while the rearward end of wall 36 terminates in a lateral inwardly extending flange 44, FIG. 3. Flanges 42 and 44 are welded to the lower forward end portion of the wheelhouse outer member 46, indicated by dash dot lines in FIG. 1, which closes the rearward end of the rocker structure 28.

Figure 2:
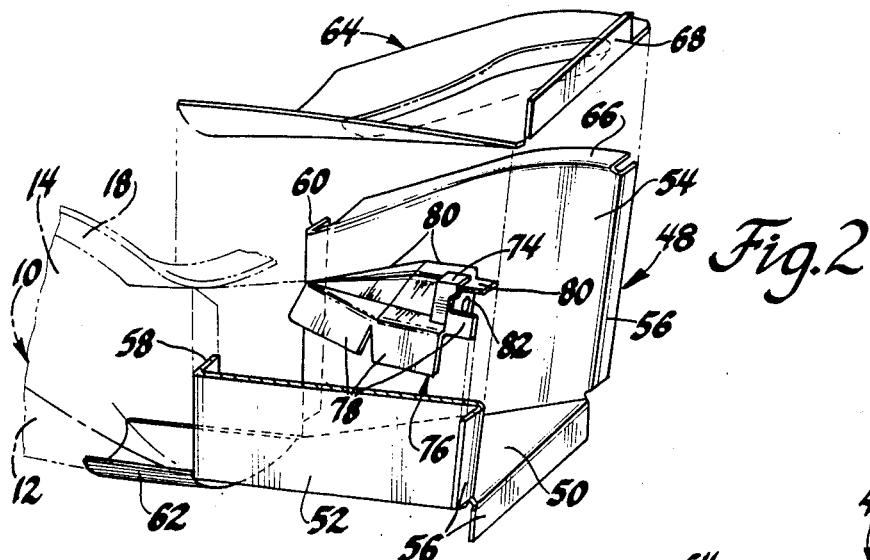
FIG. 2 is an enlarged partially exploded view of a portion of FIG. 1.
Figure 3:
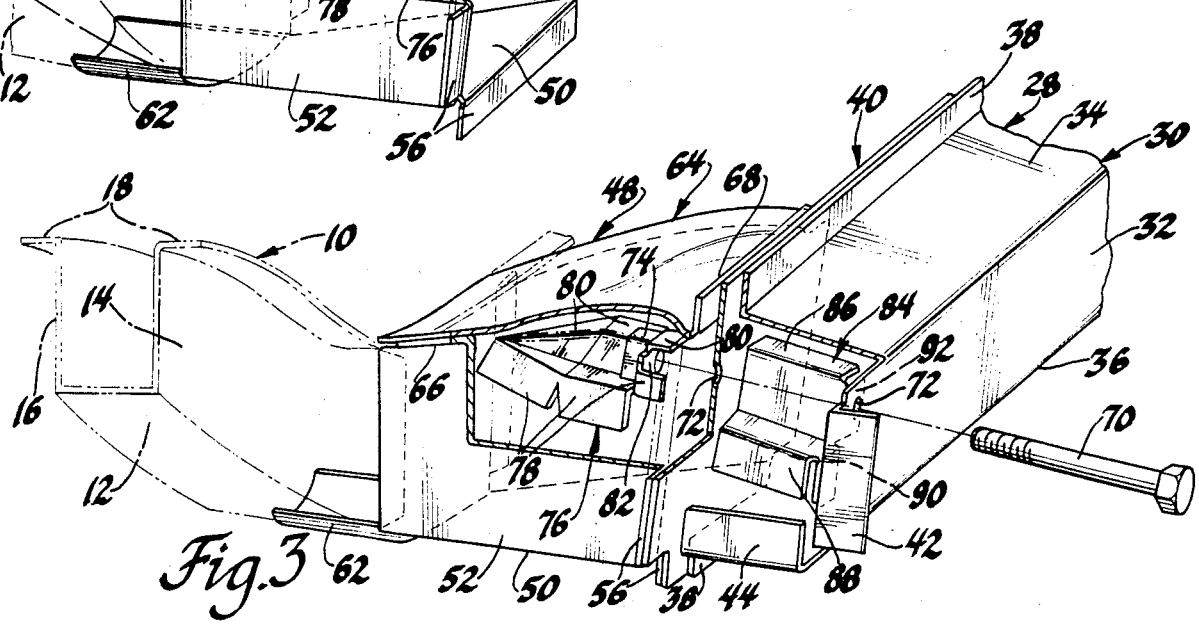
FIG. 3 is an enlarged partially exploded view of another portion of FIG. 1.

A torque box 48, FIG. 2, includes a lower wall 50, a rear wall 52 and a forward wall 54. The outer ends of walls 50, 52 and 54 are provided with outwardly extending lateral flanges 56 which are welded to the inboard surface of the rocker inner member 40 as best shown in FIG. 3. The inboard end of wall 52 is provided with an inwardly extending lateral flange 58 and the inboard end of wall 54 is provided with an outwardly extending lateral flange 60. Flanges 58 and 60 are welded to the outboard wall 14 of the frame rail 10. The inboard end of wall 50 includes a lateral flange 62 which is shaped to the lower wall 12 of the frame rail 10 and is welded thereto as best shown in FIGS. 2 and 3. A cover member 64 provides the upper wall of the torque box and is welded to upper laterally outwardly extending flanges 66 of walls 52 and 54. Member 64 includes a laterally upwardly extending flange 68 at its outer end which is secured to the rocker inner member 40 as best shown in FIG. 3. The inner end of the cover member 64 overlies and is secured to the flange 18 of the outboard wall 14 of the rail 10. The cover member 64 underlies the rear pan 20.

Impact loads against the rear bumper are resisted by the frame rail 10 and its lefthand counterpart. These loads are transferred to the rocker structure 28 by the torque box 48 which extends between and is welded to both the rail 10 and the rocker structure. In order to reinforce the weldments between the flanges 56 and 68 of the torque box structure and the rocker inner member 40, a tension member 70 interconnects the rocker outer member 30 and the torque box. As best shown in FIGS. 2 and 3, the tension member 70 is in the form of a bolt which extends through aligned openings 72 in the outer wall 32 of the rocker outer member 30 and the rocker inner member 40. A nut 74 for the bolt 70 is mounted to a bracket 76 having flanges 78 which are welded to the rear wall 52 of the torque box and flanges 80 which are welded to the cover member 64 for such box. The nut 74 is welded to a flange 82 of the bracket 76 which is apertured to permit the passage of the bolt 70 therethrough into threaded engagement with the nut 74. The flange 82 locates the nut in alignment with the opening 72 and prevents turning of the nut when the bolt 70 is threaded into the nut. The flange 82 is anchored to wall 52 and cover member 64 of the torque box by respective flanges 78 and 80. The outer wall 32 of the rocker outer member 30 is reinforced by a stiffener bracket 84 having a flange 86 which is welded to the upper wall 34 of such rocker member, a flange 88 which is welded to the wheelhouse outer member 46 and flanges 90 and 92 which are welded to the outer wall 32 of such rocker member. The stiffener bracket 84 reinforces the outer wall 32 of the rocker outer member 30 against collapse when the bolt 70 is threaded into the nut 74 with a predetermined torque.

Thus this invention provides an improved vehicle body structure.

The embodiments of the invention in which an exclusive property or privilege is claimed are defined as follows:

1. In a vehicle body having a bumper structure receiving impact loads, an elongated rail structure extending longitudinally of the vehicle and receiving impact loads from the bumper structure, and a hollow rocker structure extending longitudinally of the vehicle and including upper and lower walls joined by an outer wall and an inner wall, the combination comprising, a torque box structure extending transversely of the vehicle between the rail structure and the rocker structure and including forward and rearward walls joined by upper and lower walls defining a hollow enclosure extending transversely of the vehicle and opening outwardly to the inner wall of the rocker structure and inwardly to the rail structure, means securing the torque box walls to the rocker structure and to the rail structure so that the torque box walls pass impact loads from the rail structure to the rocker structure, and, an elongated tension member extending transversely of the vehicle through the torque box structure and the rocker structure and having the inner end thereof secured to at least one wall of the torque box structure and the outer end thereof secured to at least one wall of the rocker structure to reinforce the means securing the torque box walls to the rocker structure and prevent failure thereof.

2. In a vehicle body having a bumper structure receiving impact loads, an elongated rail structure extending longitudinally of the vehicle and receiving impact loads from the bumper structure, and a hollow rocker structure extending longitudinally of the vehicle and including upper and lower walls joined by an outer wall and an inner wall, the combination comprising, a torque box structure extending transversely of the vehicle between the rail structure and the rocker structure and including forward and rearward walls joined by upper and lower walls defining a hollow enclosure extending transversely of the vehicle and opening outwardly to the inner wall of the rocker structure and inwardly to the rail structure, means securing the torque box walls to the rocker structure and to the rail structure so that the torque box walls pass impact loads from the rail structure to the rocker structure, and, an elongated tension member extending through the inner and outer walls of the rocker structure and into the torque box structure, means securing one end of the tension member to the outer wall of the rocker structure, and means securing the other end of the tension member to the torque box structure, the tension member reinforcing the connecting means between the torque box structure and rocker structure.

3. In a vehicle body having a bumper structure receiving impact loads, an elongated rail structure extending longitudinally of the vehicle and receiving impact loads from the bumper structure, and a hollow rocker structure extending longitudinally of the vehicle and including upper and lower walls joined by an outer wall and an inner wall, the combination comprising, a torque box structure extending transversely of the vehicle between the rail structure and the rocker structure and including forward and rearward walls joined by upper and lower walls defining a hollow enclosure extending transversely of the vehicle and opening outwardly to the inner wall of the rocker structure and inwardly to the rail structure, means securing the torque box walls to the rocker structure and to the rail structure so that the torque box walls pass impact loads from the rail structure to the rocker structure, and, a tension member extending through the outer and inner walls of the rocker structure and into the torque box structure, the tension member having an outer head portion seating on the outer wall of the rocker structure and an inner terminal portion, and means securing the inner end portion of the tension member to the torque box structure.

4. In a vehicle body having a bumper structure receiving impact loads, an elongated rail structure extending longitudinally of the vehicle and receiving impact loads from the bumper structure, and a hollow rocker structure extending longitudinally of the vehicle and including upper and lower walls joined by an outer wall and an inner wall, the combination comprising, a torque box structure extending transversely of the vehicle between the rail structure and the rocker structure and including forward and rearward walls joined by upper and lower walls defining a hollow enclosure extending transversely of the vehicle and opening outwardly to the inner wall of the rocker structure and inwardly to the rail structure, means securing the torque box walls to the rocker structure and to the rail structure so that the torque box walls pass impact loads from the rail structure to the rocker structure, and, a tension member extending through the walls of the rocker structure and into the torque box structure, the tension member having an outer headed portion seating on the outer wall of the rocker structure and an inner threaded end portion, and threaded means mounted on the torque box structure and threadedly receiving the inner threaded end portion of the tension member, the tension member reinforcing the connecting means between the torque box structure and rocker structure.

5. In a vehicle body having a bumper structure receiving impact loads, an elongated rail structure extending longitudinally of the vehicle and receiving impact loads from the bumper structure, and a hollow rocker structure extending longitudinally of the vehicle and including upper and lower walls joined by an outer wall and an inner wall, the combination comprising, a torque box structure extending transversely of the vehicle between the rail structure and the rocker structure and including forward and rearward walls joined by upper and lower walls defining a hollow enclosure extending transversely of the vehicle and opening outwardly to the inner wall of the rocker structure and inwardly to the rail structure, means securing the torque box walls to the rocker structure and to the rail structure so that the torque box walls pass impact loads from the rail structure to the rocker structure, and, a bolt having an outer head and an inner threaded end, the bolt extending through aligned apertures in the outer and inner walls of the rocker structure and having its head seated on the outer wall of the rocker structure, bracket means mounted to the walls of the torque box structure internally thereof, and nut means mounted to the bracket means and threadedly receiving the inner threaded end of the bolt, the bolt reinforcing the connecting means between the torque box structure and rocker structure.

6. The combination recited in claim 5 wherein the bracket means is secured to the rearward and upper walls of the torque box structure.

* * * * *